United States Patent [19]

Herden et al.

[11] 4,368,453

[45] Jan. 11, 1983

[54] RAPID ACTING GAS TEMPERATURE SENSOR

[75] Inventors: Werner Herden, Stuttgart; Hans-Martin Hochenberger, Nürtingen; Hans Neu, Vaihingen; Hans-Joachim Seidel, Waiblingen; Werner Pfander, Fellbach; Heiko Gruner, Gerlingen; Erich Zabler, Karlsruhe; Claus-Dietrich Pilch, Remchingen; Karl-Otto Linn, Karlsruhe, all of Fed. Rep. of Germany

[73] Assignee: Robert Bosch GmbH, Stuttgart, Fed. Rep. of Germany

[21] Appl. No.: 203,514

[22] Filed: Nov. 3, 1980

[30] Foreign Application Priority Data

Nov. 3, 1979 [DE] Fed. Rep. of Germany ....... 2944487

[51] Int. Cl.³ .............................................. H01C 3/04
[52] U.S. Cl. ...................................... 338/25; 338/28; 338/275; 338/309
[58] Field of Search ................. 338/25, 22 R, 28, 275, 338/307–309, 314; 29/612, 613; 73/362 AR

[56] References Cited

U.S. PATENT DOCUMENTS 3,778,744  12/1973  Brandi .............................. 338/275 X
3,918,078  11/1975  Tuley et al. ....................... 29/612 X
4,183,136   1/1980  Colla .................................. 338/25 X
4,186,368   1/1980  White et al. ........................... 338/28
4,243,968   1/1981  Scott ..................................... 338/28

Primary Examiner—C. L. Albritton
Attorney, Agent, or Firm—Frishauf, Holtz, Goodman & Woodward

[57] ABSTRACT

A meander-shaped layer of nickel is deposited by evaporation on a ceramic wafer over an intermediate layer of tantalum serving to improve adhesion, and covered by a protective coating of silicon or epoxy resin is used as a temperature sensor in the intake pipe of a supercharged internal combustion engine. The low mass of the sensor element thus provided enables the resistance of the nickel path to follow rapidly, by its variation, the variations of temperature of the intake air. The sensor has a casing made up of two parts, the lower one of which has two connection prongs molded into it, the ends of which are flattened into tabs that are soldered to contact areas of the ceramic wafer. The upper casing portion has a cavity for the ceramic wafer, the lower part of which is filled with a potting compound to protect the solder joints. The width of the nickel paths that provide the temperature sensitive resistance is about 50 μm and the thickness is from 0.2 to 1 μm and the resistance may be typically 1000 ohms.

7 Claims, 4 Drawing Figures

RAPID ACTING GAS TEMPERATURE SENSOR

This invention concerns a temperature sensor for a gas flow, capable of sufficiently rapid response for service in the air intake system of an internal combustion engine, particularly a supercharged engine.

When it is necessary to control the rate of supply of fuel to an internal combustion engine in accordance with the intake air temperature, it is necessary that the temperature sensor serving to measure the air temperature be capable of following all temperature changes very rapidly, and therefore that the sensor should possess only a slight heat capacity.

THE INVENTION

It is an object of the present invention to provide a temperature sensor of very small heat capacity that can be mounted to the air intake duct of an internal combustion engine and exposed to the flow of air therein. It has been found that such a low heat capacity can be provided in a practical way by a resistance path of nickel provided by thin film technology in meander shape on a thin small plate or wafer of insulating material, protected from corrosion by a covering of silicone or epoxy resin material. It is preferred for the resistance path to be provided by a conducting nickel layer about 50 μm wide and having a thickness in the range from 0.2 to 0.6 μm, most preferably about 0.3 μm. The substrate for the thin film resistance path is preferably a ceramic wafer of a thickness of about 0.25 mm. The ends of the resistance path preferably have widened contact portions running along the longer sides of the substrate wafer, which is preferably of rectangular contour.

Means for supporting the substrate in an air duct where air can pass over it are of course necessary, and such means preferably comprise a casing composed of two pieces of insulation material, of which one holds the wafer and makes air accessible to it and the other contains connection strips molded into the casing part when the latter is injection molded, the strips being soldered to the contact portions of the nickel film structure on the ceramic substrate wafer. Preferably, the solder joint is located in a cavity filled with an epoxy resin containing up to 70% of a titanium dioxide filler and also an amine hardener.

BRIEF DESCRIPTION OF THE DRAWINGS

The invention is further described by way of illustrative example with reference to the annexed drawings, in which.

DESCRIPTION OF THE PREFERRED EMBODIMENT

Figure 1:
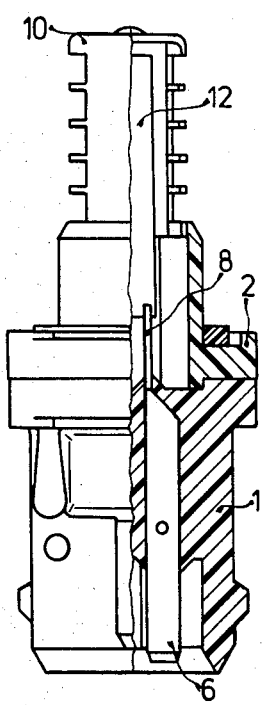
FIG. 1 is a side view of the sensor, of which the left half is shown in side elevation, and the right half in axial section.
Figure 2:
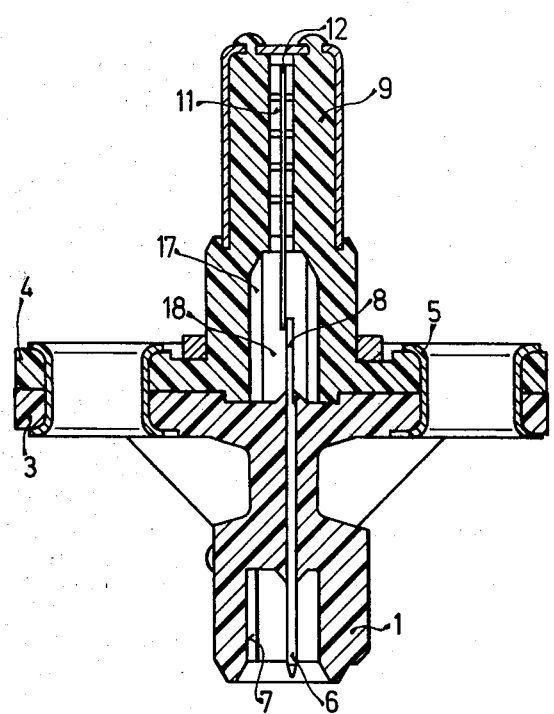
FIG. 2 is a longitudinal section of the sensor of FIG. 1 in a plane at 90° to the plane of the section in FIG. 1.
Figure 3:
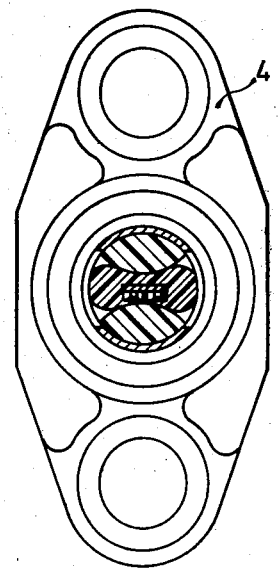
FIG. 3 is a top view along the axis of the sensor of FIGS. 1 and 2, partly in section.

The temperature sensor illustrated in the drawing is designed for building into an intake pipe, not shown in the drawing, of an internal combustion engine, for operation in the temperature range extending from −40° C. to 180° C. It has an injection molded casing of thermosetting plastic that is composed of a lower part 1 and an upper part 2. Both parts have a wide flange (3,4) at which they are connected by two hollow rivets 5.

The lower part 1 contains two prong strips 6, the lower end sections of which project into a cavity 7 serving for insertion of a connection bushing (socket connector) not shown in the drawings. At their upper ends each of the prongs 6 is pressed flat into a tab or lug 8.

Figure 4:
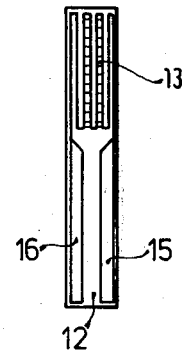
FIG. 4 is a plan view of a ceramic wafer serving as the carrier of a temperature sensitive resistance with a metallic film resistor provided thereon.

The upper part 2 of the casing has two support pillars 9 spaced from each other, above which a protective cap 10 of sheet metal is held in engagement. Windows 11, stamped out of the protective cap 10, allow the intake air of the engine to have access to a small wafer 12 of insulating material shown in more detail in FIG. 4. The wafer 12 is about 0.25 mm thick and is made of a ceramic, preferably aluminum oxide. Directly on the surface of the wafer 12, a tantalum layer is applied that serves to improve the adhesion of a meander-shaped resistance path 13 made out of nickel that is vapor deposited on top of the tantalum layer.

The nickel resistance path 13 contains a number of conducting segments, each about 10 mm long and about 50 μm wide, with a layer thickness of from 0.2 to 1 μm. The thickness of 0.3 μm is preferred for the illustrated embodiment and results in a resistance value of about 1 K ohms between the two connection conductors 15 and 16 that are wider extensions of the resistance path running along the long sides of the substrate wafer 12, likewise applied in thin film technique. These conducting films 15 and 16 are soldered to the connection tabs 8 of the prongs 6. In the region of these conducting paths 15 and 16 and their zone of connection with the tabs 8, the cavity 17 of the upper part 2 is filled with a "potting" mass 18 composed of epoxy resin having a filler of up to 70% titanium dioxide (preferably at least 75%) and also an amine hardener (preferably from 7% to 8% by weight). The solder joints of the tabs 8 with the conducting paths 15 and 16 are mechanically and chemically protected by the potting mass. The portion of the ceramic wafer 12 that extends out of the potting mass 18 and carries the meander-shaped nickel layer is protected against deterioration by the intake air by a firmly adhering protective layer of silicone resin or epoxy resin.

The particular advantage of the temperature sensor according to the invention is that it has only a very slight mass and accordingly can follow quickly the temperature changes that occur in he intake air.

Although the invention has been described with reference to a particular illustrative example, it will be understood that modifications and variations are possible within the inventive concept.

We claim:

1. Rapidly responsive temperature sensor for measuring the intake air temperature of an internal combustion engine capable of operating as a supercharged engine, comprising:
   a thin wafer of insulating material (12);
   a meander-shaped resistance path (13) applied to said insulating wafer (12) by a thin film technique and comprising multiple conducting segments formed essentially parallel to one another and having extended end portions (15, 16), and made of metallic resistive material;
   a protective layer of a polymeric material selected from the group consisting of silicone and epoxy resins, covering said resistance path and said insulating wafer and protecting them against corrosion and abrasion;

means for supporting said wafer on the air intake duct of an engine in a manner allowing a flow of air past said wafer, and conductors (6) each connected at one end (8) to one of said extended end portions (15, 16) of said resistance path for facilitating connection of an external circuit to said resistance path;

wherein the conducting segments of the resistance path (13) are each about 10 mm in length, substantially 50 μm in width and 0.2–0.6 μm thick, and the insulating wafer is made of a ceramic material and is substantially 0.25 mm thick.

2. A sensor as defined in claim 1, in which said extended end portions (15, 16) of said resistance path contain a larger amount of conducting material per unit of length for providing contact surfaces, said path end portions being located along edges of said wafer.

3. A sensor as defined in claim 1, in which said resistance path segments have a thickness of about 0.3 μm.

4. A sensor as defined in claim 2, in which said end portions (15,16) of said resistance path are substantially wider than the rest of said resistance path.

5. A sensor as defined in claim 4, in which said means for supporting said insulating wafer (12) is composed of two casing parts (1,2) made of insulating material, and in which said conductors for facilitating connection of said resistance path to an external circuit comprise a pair of connection prongs (6) injection molded into one of said casing parts and respectively soldered to said end portions (15,16) of said resistance path (13) on said wafer.

6. A sensor as defined in claim 5, in which said connection prongs (6) are provided with solder-connection tabs (8) at their extremities respectively soldered to said end portions of said resistance path, and in which the casing portion other than the one in which said prongs are injection molded has a cavity surrounding said connection tabs (8) and said widened portions (15,16) of said resistance path, which cavity is filled with an epoxy resin potting compound.

7. A sensor as defined by claim 6, wherein the potting compound (18) consists essentially of a mixture of epoxy resin, a mineral filler material and a hardening agent.

* * * * *